March 18, 1941.  J. A. BETTY  2,235,470
BEET HARVESTER
Filed Aug. 8, 1939  4 Sheets-Sheet 1
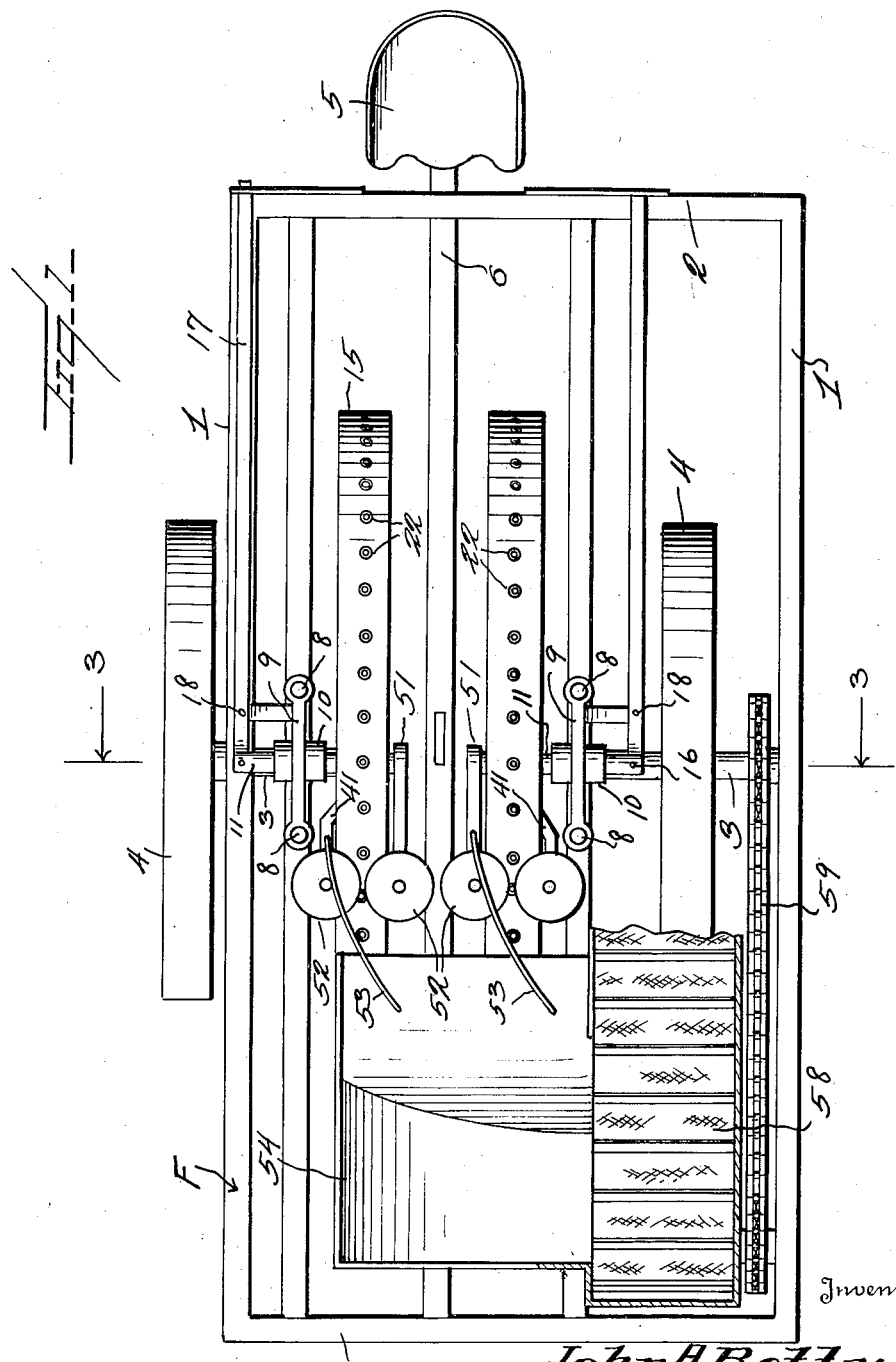
Inventor
John A. Betty
By Watson E. Coleman
Attorney

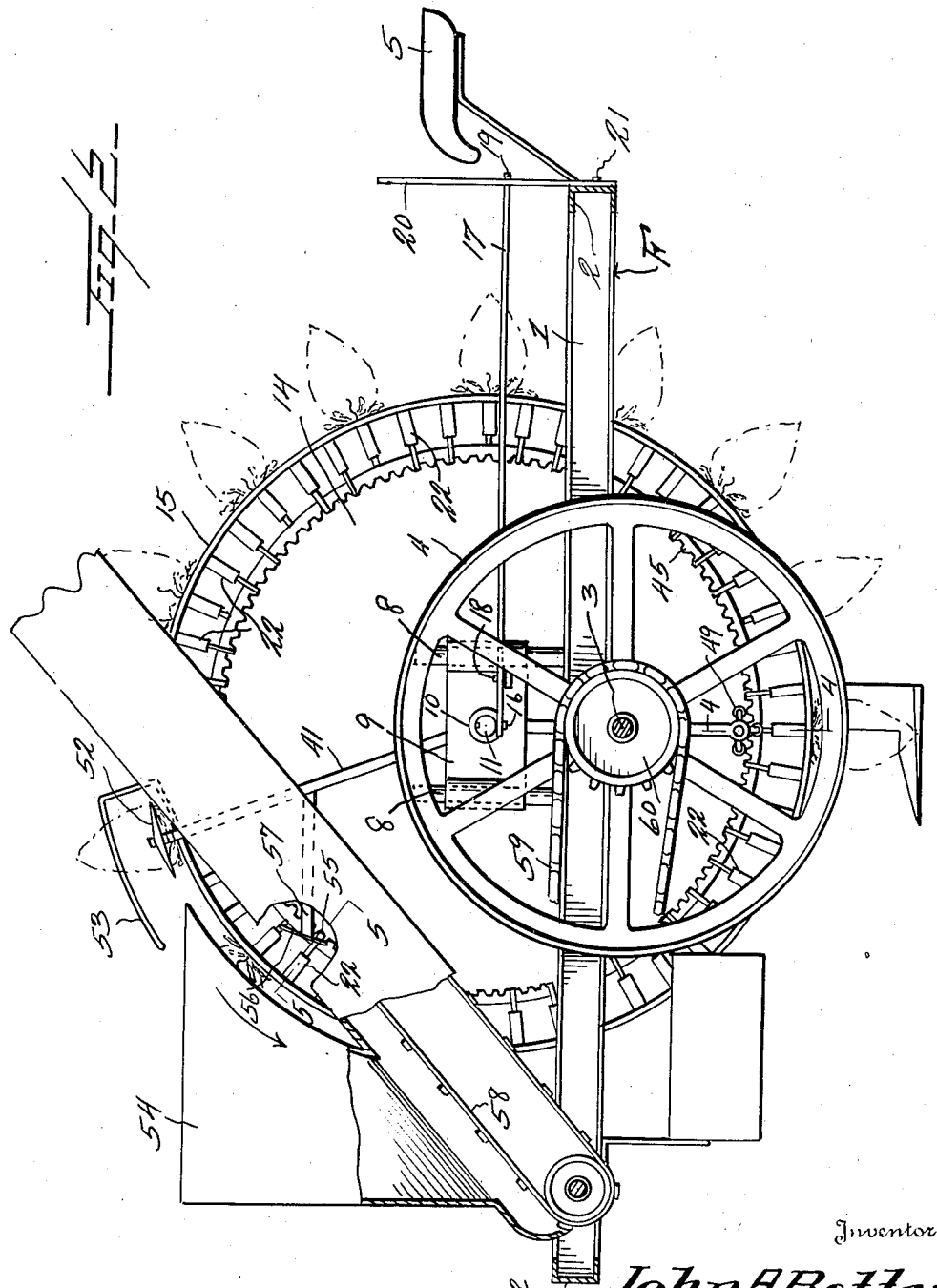

March 18, 1941.   J. A. BETTY   2,235,470
BEET HARVESTER
Filed Aug. 8, 1939   4 Sheets-Sheet 3
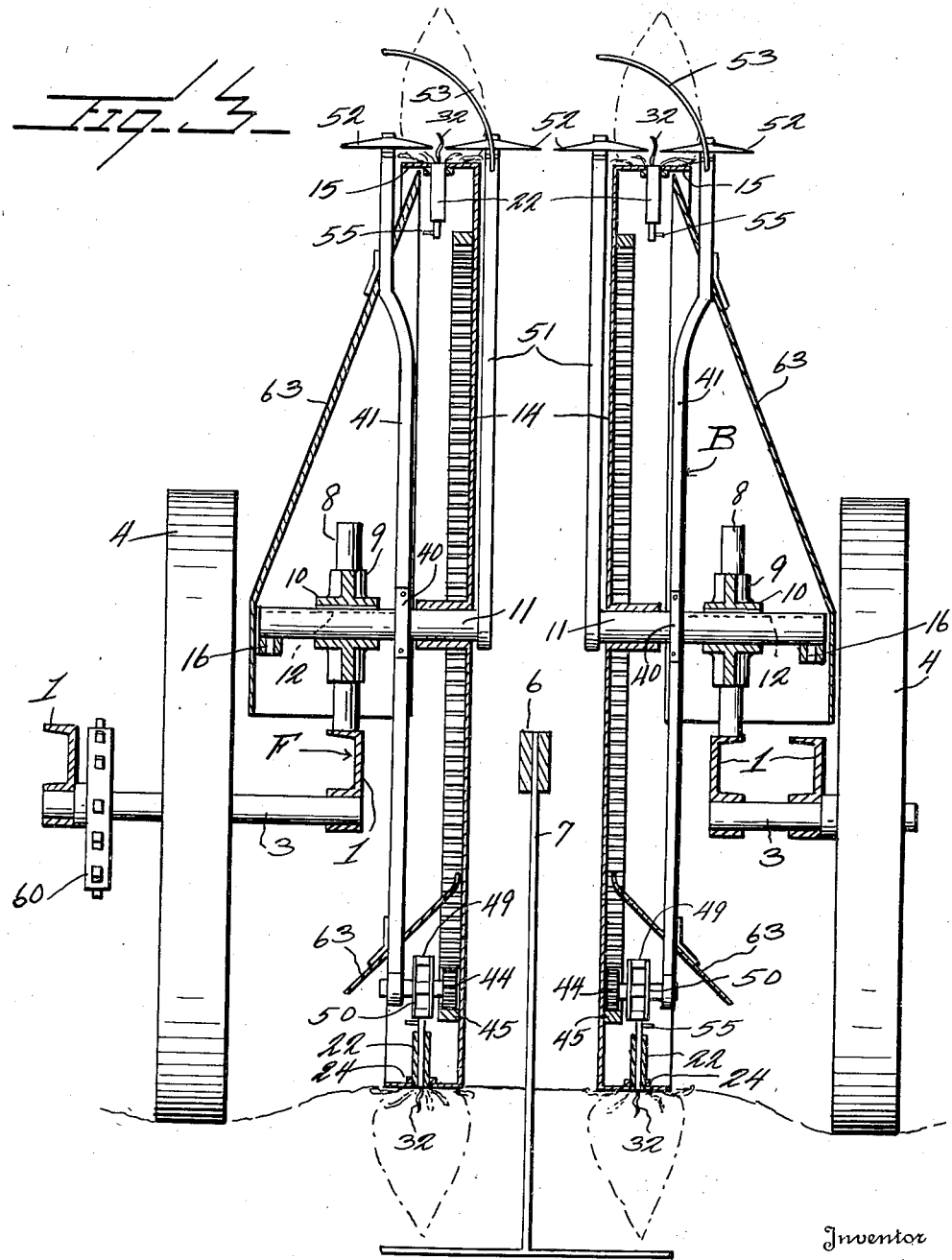

March 18, 1941.  J. A. BETTY  2,235,470
BEET HARVESTER
Filed Aug. 8, 1939   4 Sheets-Sheet 4
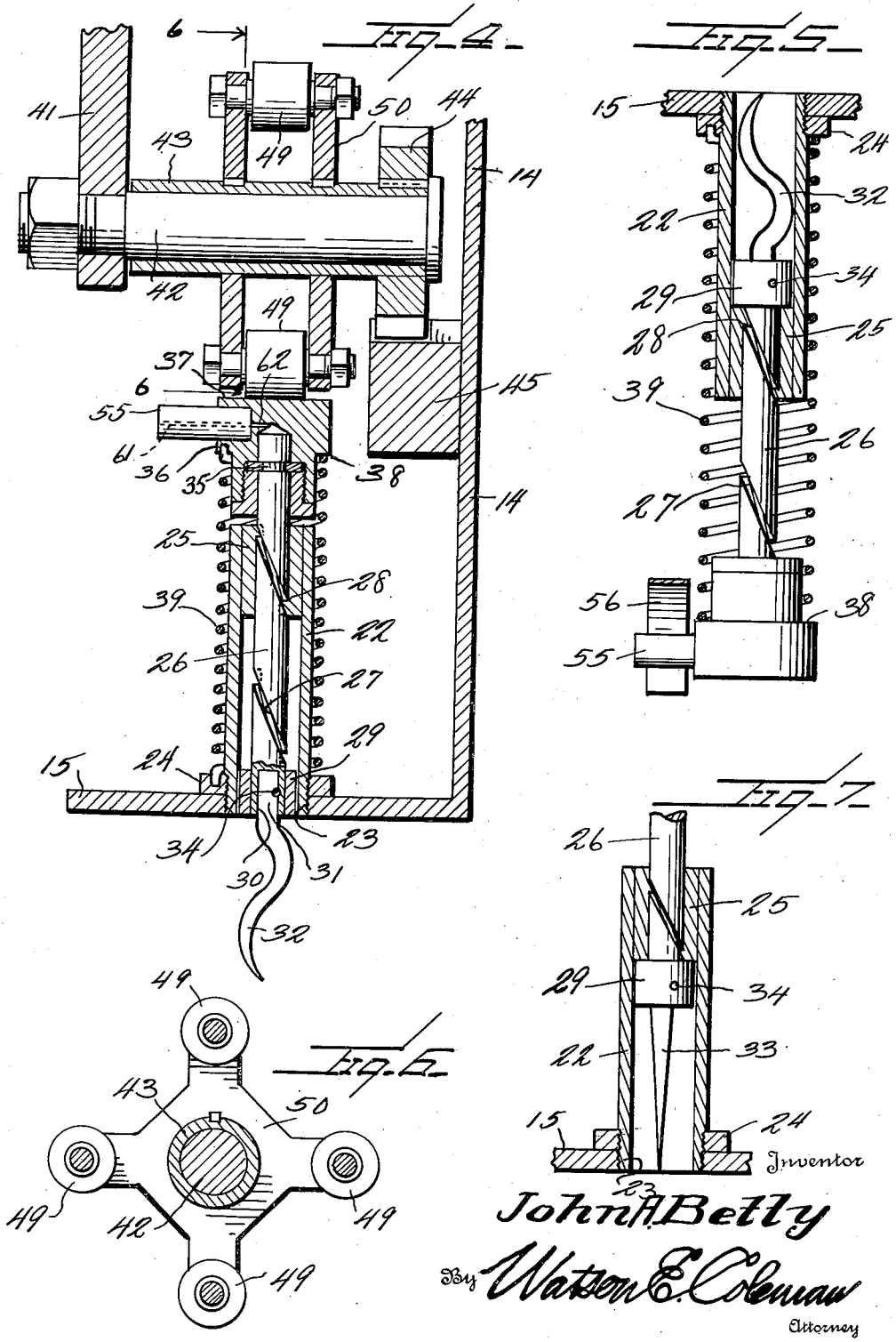
Inventor
John A. Betty
By Watson E. Coleman
Attorney Patented Mar. 18, 1941

2,235,470

UNITED STATES PATENT OFFICE 2,235,470

BEET HARVESTER

John A. Betty, Corcoran, Calif.

Application August 8, 1939, Serial No. 289,027

10 Claims. (Cl. 55—108)

This invention relates to a beet harvester, and it is an object of the invention to provide a machine of this kind particularly designed and adapted for use in the harvesting of sugar beets and wherein the machine is so constructed and assembled to remove the beets from the ground and carry the same to a topping mechanism.

Another object of the invention is to provide a device of this kind including a rotating beet elevator carrying a plurality of circumferentially spaced members to penetrate the beets as the elevator travels thereover whereby the device is of particular importance and advantage in the harvesting of beets wherein a portion of the root grows above the ground surface.

A further object of the invention is to provide a machine of this kind having means for severing the tops from the beets at a uniform height.

An additional object of the invention is to provide a machine of this kind which comprises means for raising the beets after being loosened from the soil; means for topping the beets while in raised position; and means for casting the beet tops upon the ground.

A still further object of the invention is to provide a machine of this kind including a rotary beet elevator having means spaced circumferentially therearound for engaging the beets to lift the same as the machine travels along the beet row, together with means for shifting said elevator in a direction transversely of the path of travel to allow the operator to maintain said rotary elevator over substantially the center of the beet row.

The invention consists in the details of construction and in the combination and arrangement of the several parts of my improved beet harvester whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a beet harvester constructed in accordance with an embodiment of my invention with the carry-off elevator in fragment;

Figure 2 is a view in side elevation with portions broken away of the machine as illustrated in Figure 1;

Figure 3 is a vertical sectional view taken substantially on the line 3—3 of Figure 1 looking in the direction of the arrows;

Figure 4 is an enlarged detailed sectional view taken substantially on the line 4—4 of Figure 2;

Figure 5 is an enlarged fragmentary detailed sectional view taken substantially on the line 5—5 of Figure 2;

Figure 6 is a sectional view taken substantially on the line 6—6 of Figure 4;

Figure 7 is a fragmentary view partly in section and partly in elevation illustrating a beet penetrating member constructed in accordance with another embodiment of the invention.

As disclosed in the accompanying drawings, F denotes a frame of desired dimensions and which, as herein disclosed, comprises a plurality of transversely spaced and substantially parallel members 1 having their extremities connected by the cross members 2. The members 1 are arranged in pairs at each side of the frame with the members of one pair spaced apart a distance greater than the members of the second pair. Each of these pairs of members 1 at substantially the longitudinal center thereof carries an axle 3 upon which is mounted a ground engaging wheel 4. It is to be noted that in connection with each of these axles 3 the same does not extend inwardly beyond the inner member 1 of its pair.

The forward end portion of the frame F is adapted to be hitched with any suitable drafting medium while the rear end member 1 carries an operator's seat 5.

It is also to be noted that one of the wheels 4 is positioned outwardly of the adjacent pairs of members 1 while the second wheel 4 is mounted on the axle 3 between the members 1 of its pair.

Disposed lengthwise of the frame F and operatively supported thereby is a plow beam 6. This beam 6 is positioned substantially midway between the inner members 1. Carried by this beam 6 at substantially the longitudinal center of the frame F is a plow structure 7 of a hand breaker or sub-soiler type which is adapted to loosen from the soil beets in two adjacent rows as particularly illustrated in Figure 3 of the drawings.

The central portion of the inner member of each of the pairs of members 1 is provided with two upstanding posts 8 rigidly secured thereto and spaced apart a desired distance lengthwise of the member. Freely engaged with these posts 8 for up and down sliding movement thereon is a floating bracket 9. The central portion of this bracket 9 is formed to provide a central bearing sleeve 10 disposed transversely of the frame and through which is slidably directed an axle 11. This axle 11 is keyed, as at 12, to the bearing sleeve 10 whereby the axle 11 is held against rotation yet is permitted to have endwise movement in both directions through the sleeve 10.

Rotatably mounted upon the inner end portion of the axle 11 is a beet elevating wheel 14 of desired radius and which is provided at its periphery with a relatively broad rim 15. The wheel 14, or more particularly the rim 15 thereof, is adapted to roll over the beets of a row and in order to assure this coaction between the wheel and a beet row the axle 11 is shifted endwise in the desired direction by the operator from his seat 5.

In the present embodiment of my invention the outer end portion of each of the axles 11 has operatively connected therewith, as at 16, an end portion of an elongated rod 17. This rod extends rearwardly of the frame F and is supported by the adjacent bracket 9 for lateral swinging movement, as indicated at 18. The rear end portion of this rod 17 operatively engages, as at 19, an upstanding lever 20 having its lower end portion pivotally connected, as at 21, with the rear cross member 2. This lever 20 is in close proximity to the seat 5 so that the occupant thereof can readily operate said lever to shift the axle 3 as desired.

The rim 15 carries the inwardly and circumferentially spaced sleeves 22 which are also radial with the axial center of the wheel 14. As is particularly illustrated in the accompanying drawings, it is to be noted that these sleeves 22 do not project beyond the outer or peripheral surface of the rim 15 and, as is illustrated in Figures 4 and 5, each of these sleeves 22 is open at its opposite end. These sleeves 22 may be mounted thru the rim 15 in any manner as desired but in the present embodiment of my invention the outer end of each of the sleeves 22 is threaded within a suitably positioned opening 23 in the rim 15 and effectively maintained in such connection by a lock nut 24.

Fixed within the inner portion of the sleeve 22 is a nut 25 through which passes the rotating shaft 26 of desired length. This shaft 26 throughout its major portion is provided in its periphery with the spiral groove 27 in which extends a lug 28 carried by the nut 25 so that upon endwise movement of the shaft 26 the same will be caused to rotate. The outer portion of the shaft 26 carries a surrounding guide collar 29 which coacts with the internal wall of the sleeve 22.

The outer end of the shaft 26 is formed to provide a socket 30 to receive the shank 31 of an elongated spiral penetrating member 32. This member 32 can, if preferred, constitute a straight member as indicated at 33 in Figure 7. The shaft 26 is of a length to have its inner end portion at all times extending beyond the inner end of the sleeve 22 and the sleeve 22 is of such length to house the member 32 or 33 therein when the shaft 26 is in its retracted position. In the present embodiment of my invention the member 32 or 33 is shown as being held within the socket 30 by a lock pin 34 although, if preferred, other means for this purpose may be used.

The rear extended portion of the shaft 26 is in swivelled connection, as at 35, with a cap or head 36. The outer face 37 of this cap or head 36 is substantially flat and said cap or head 36 is formed to provide a surrounding shoulder 38 opposed to the rim 15 or more particularly the lock nut 24.

Interposed between this shoulder 38 and the lock nut 24 is a coil spring 39 surrounding the sleeve 22 and of a tension to return the shaft 26 to its retracted position and normally maintain the same in such position.

Each of the axles 11 between the wheel 14 thereof and its associated bracket 9 has secured thereto, as at 40, the central portion of an elongated arm 41. The portion of the arm 41 below the axle 11 is vertically disposed and terminates at a point in close proximity to the inner ends of the sleeves 22 passing thereunder at their lowermost point. The lower end of this arm 41 carries a stub axle 42 which is disposed toward the associated wheel 14. Freely mounted on this axle 42 for rotation thereon is a sleeve 43. Fixed for rotation with the sleeve 43 and positioned at the outer end portion thereof is a pinion 44 which constantly meshes with an internal gear 45 carried by and fixed for rotation with the wheel 14. This internal gear 45 upon rotation of the wheel 14 rotates the sleeve 43 and at such a speed that as the wheel 14 rotates the rollers 46 carried by the spider wheel 50 which successively contact with the flat heads 36 of the shaft 26 so that when a sleeve 22 is in proper position above a beet the shaft 26 will be forced outwardly to cause the member 32 or 33 carried thereby to penetrate the beet so that as the wheel 14 continues to rotate such beet will be raised from the ground and carried upwardly and rearwardly to the topping mechanism to be hereinafter described. The wheel 50 is fixed to rotate with the sleeve 43.

The portion of the arm 41 above the axle 11 in the present embodiment of the invention is disposed on a predetermined rearward incline so that the upper end portion thereof will terminate above the wheel 14 and rearwardly of the top or high point of the wheel. Substantially parallel to this upper portion of the arm 41 and at the opposite side of the wheel 14 is an upstanding arm 51. The lower end portion of this arm 51 is fixed to the inner end portion of the axle 11 while the opposite or upper end thereof terminates beyond the periphery of the wheel 14.

Rotatably supported by the upper end portions of these arms 41 and 51 are the cutting disks 52. These disks 52 are so positioned one with respect to the other that as a beet passes therebetween said cutting disks will cut into the top or crown of the beet but not entirely thereacross. The beet as it is carried upwardly by the wheel 14 is maintained in desired position upon the rim 14 under the tension of the spring 39 operatively associated with the member 32 or 33 which has penetrated the beet. The extent of severance effected by the disks 52 is determined by the extent of the spacing between such disks 52.

After the partially severed beet passes away and downwardly from the disks 52 said beet will contact with a breaker arm 53. One end portion of the breaker arm 53, as herein disclosed, is suitably connected to the upper portion of the arm 51 below the cutting disks 52 thereon and said arm is extended upwardly and over the cutting disks 52 in a rearward direction and on a curvature to intersect the path of travel of the beet as it moves away from the cutting disks 52. As the partially severed beet contacts with the breaker arm 53 said arm will break off the beet from its top or crown and cause the same to be received within a bin 54 carried by the forward portion of the frame F. After the body portion of the beet has been broken off the top or crown part is still held to the arm 15 of the wheel by the member 32 or 33. However, after the beet top or crown has been carried below the top or open end of the bin 54 a laterally directed pin 55 carried by the cap or head 36 of each of the shafts 26 comes into contact with a cam plate 56 secured to the outer end of a forwardly directed arm 57 carried by the upper portion of the arm 41. This cam plate 56 is so positioned that as the pin 55 rides along and under the plate 56 the cap or head 36 together with the shaft 26 will be retracted a distance sufficiently to entirely withdraw the member 32 or 33 from the beet top or crown whereupon such top or crown will drop to the ground.

In the present embodiment of my invention the wheels 14 are not power driven but rotate by the coaction of said wheels and their members 32 or 33 with the ground surface or beets as the machine travels along a beet row. It is believed to be obvious, however, that without resorting to an inventive act the wheels may be driven from any suitable source of power.

Leading from the bin 54 is a carry-off elevator 58 herein disclosed as of an endless belt type and which is adapted to discharge as may be desired. This elevator 58 is driven through the medium of a chain 59 from a gear 60 mounted to rotate with one of the ground wheels 4.

It is also believed to be obvious that in operation each of the wheels 14 by its own weight assures the desired penetration of a member 32 or 33 within the beet as the wheel passes over the beet while in the row.

The bin 54 has disposed axially therethrough a port 61 which registers with a port 62 in the associated cap or head 36 whereby means are provided for lubricating the swivel connection 35.

The arms 41, as herein disclosed, carry suitably positioned shields 63 particularly to protect the spider wheels 50 and the sleeves 22 and floating bracket 9 against obstruction by dirt or beet tops or crowns as cast off by the arms 53.

The pin 55 is maintained in its desired effective position by having one end portion of the spring 39 secured to the cap or head 36 with the opposite end portion anchored to the nut 24 as is clearly illustrated in Figure 4 of the drawings.

From the foregoing description it is thought to be obvious that a beet harvester constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A beet harvester comprising a portable frame, a rotatable beet elevator, means for supporting said elevator for rolling contact along and over a row of beets, penetrating members carried by the elevator for engaging the beets as the elevator passes thereover and carrying said beets upwardly, a cutting means for partially severing the crown of the beet as the same travels with the elevator, and means imposing lateral pressure upon the beet after being partially severed and as the beet travels further with the elevator for breaking off the beet.

2. A machine of the class described comprising a portable frame, a rotating elevator, a mounting for the elevator, means carried by the frame for holding said mounting for up and down movement, beet penetrating members carried by the peripheral portion of the elevator at points spaced circumferentially therearound, means carried by the mounting for the elevator for taking off the crowns of the beets after being carried upwardly by the elevator, said last named means comprising a pair of rotating cutting members between which the beet passes to partially sever the crown portion of the beet, and means imposing lateral pressure upon the beet from the crown portion after passing between the cutting members for breaking off the beet.

3. A machine of the class described comprising a portable frame, a rotatable elevator, means for supporting the elevator upon the frame for rotation about substantially a horizontal axis, said elevator being positioned to roll over a row of beets, a plurality of penetrating members carried by the peripheral portion of the elevator and spaced circumferentially therearound, means for supporting each of said penetrating members for movement in a direction substantially radial of the elevator, means for normally maintaining each of said penetrating members retracted inwardly of the periphery of the elevator, means for projecting each of the penetrating members as it passes over a beet to extend within said beet and carry the same upwardly as the elevator rotates, means for topping the beet after the same has been carried upwardly by the elevator, and means for retracting the penetrating members after topping of the beet.

4. A machine of the class described comprising a portable frame, a rotating elevator mounted upon the frame and adapted to roll over and along a row of beets, penetrating members carried by the elevator, means for supporting said penetrating members for movement substantially radial of the elevator, means for normally maintaining each of the penetrating members in a retracted position with respect to the elevator, means for extending each penetrating member to enter a beet as the elevator rolls over the beet to carry said beet upwardly with the elevator, and means for casting off the beet after it has been carried upwardly by the elevator a predetermined distance.

5. A machine of the class described comprising a portable frame, a rotating elevator mounted upon the frame and adapted to roll over and along a row of beets, penetrating members carried by the elevator, means for supporting said penetrating members for movement substantially radial of the elevator, means for normally maintaining each of the penetrating members in a retracted position with respect to the elevator, means for extending each penetrating member to enter a beet as the elevator rolls over the beet to carry said beet upwardly with the elevator, means for casting off the beet after it has been carried upwardly by the elevator a predetermined distance, said penetrating member having its entering portion spiral, and means for rotating the penetrating member as it is moved outwardly to enter a beet.

6. A machine of the class described comprising a portable frame, a rotating elevator carried thereby for rolling contact over and along a row of beets, a plurality of circumferentially spaced sleeves carried by the peripheral portion of the elevator and disposed inwardly and substantially radial thereof, the opposite ends of the sleeves being open, a shaft disposed thru each of the sleeves, a penetrating member carried by the outer extremity of each of the shafts, a member rotatably carried by the frame and driven from the elevator when rotating for moving the shaft downwardly to cause the penetrating member to enter a beet, as said member passes over the beet.

7. A machine of the class described comprising a portable frame, a rotating elevator carried thereby for rolling contact over and along a row of beets, a plurality of circumferentially spaced sleeves carried by the peripheral portion of the elevator and disposed inwardly and substantially radial thereof, the opposite ends of the sleeves being open, a shaft disposed thru each of the sleeves, a penetrating member carried by the outer extremity of each of the shafts, a member rotatably carried by the frame and driven from the elevator when rotating for moving the shaft downwardly to cause the penetrating member to enter a beet as said member passes over the beet, said shaft being provided along its periphery with a spiral groove, a part carried by the sleeve extending within said groove to cause the shaft to rotate as the same moves axially of the sleeve.

8. A machine of the class described comprising a portable frame, a rotating elevator, means for mounting the elevator upon the frame for rolling contact along a row of beets, a plurality of penetrating members carried by the peripheral portion of the elevator, means for supporting said penetrating members for reciprocating movement substantially radial of the elevator, means for normally maintaining said penetrating members retracted, and a movable member carried by the frame and driven from the elevator when in rotation for successively extending the penetrating members to cause the same to enter the beets as they pass thereover to carry the beets upwardly with the elevator, and a breaker arm positioned for contact with the beets when raised to a predetermined point by the elevator for casting off the beets.

9. A machine of the class described comprising a portable frame, upstanding posts carried thereby and spaced apart in the direction in which the frame is adapted to travel, a bracket freely engaged with said posts for up and down movement, an axle carried by the bracket and disposed transversely of the direction in which the frame is adapted to travel, coacting means carried by the axle and bracket for holding the axle against rotation but allowing the axle to have endwise movement, means operable at will for moving said axle endwise in either direction, a rotating elevator mounted upon the axle for rolling contact upon and along a row of beets, and means carried by said elevator for penetrating the beets as the elevator rolls thereover to carry the beets upwardly, and means for casting off the beets when raised to a desired height.

10. A beet harvester comprising a portable frame, a rotatable beet elevator, means for supporting said elevator for rolling contact along and over a row of beets, penetrating members carried by the elevator for engaging the beets as the elevator passes thereover and carry said beets upwardly, a cutting means for partially severing the crown of the beet as the same travels with the elevator, and a breaker arm intersecting the path of travel of the penetrating members, said breaker arm extending from a point in advance of to a point rearwardly of the cutting means and having contact with the beets after being partially severed for breaking off the beet.

JOHN A. BETTY.